United States Patent
Mori

(10) Patent No.: US 7,332,848 B2
(45) Date of Patent: Feb. 19, 2008

(54) METHOD OF DAMPING ACTUATOR AND ACTUATOR

(75) Inventor: Shigeki Mori, Akita (JP)

(73) Assignee: Akita Prefecture, Akita-shi (JP)

( * ) Notice: Subject to any disclaimer, the term of this patent is extended or adjusted under 35 U.S.C. 154(b) by 0 days.

(21) Appl. No.: 11/388,404

(22) Filed: Mar. 24, 2006

(65) Prior Publication Data

US 2006/0175936 A1 Aug. 10, 2006

Related U.S. Application Data

(63) Continuation of application No. PCT/JP2004/011016, filed on Jul. 27, 2004.

(30) Foreign Application Priority Data

Mar. 15, 2004 (JP) .............................. 2004-073233

(51) Int. Cl.
*H01L 41/04* (2006.01)
*H01L 41/08* (2006.01)

(52) U.S. Cl. .................................................. 310/328
(58) Field of Classification Search ................. 310/328
See application file for complete search history.

(56) References Cited

U.S. PATENT DOCUMENTS

| | | | | |
|---|---|---|---|---|
| 4,874,980 | A * | 10/1989 | Mine et al. | ................... 310/328 |
| 5,270,984 | A * | 12/1993 | Mine | ........................... 367/140 |
| 5,281,470 | A * | 1/1994 | Kobayashi et al. | .......... 442/179 |
| 5,479,064 | A * | 12/1995 | Sano | ........................... 310/328 |
| 2002/0049267 | A1 * | 4/2002 | Zhang et al. | .................. 524/82 |
| 2005/0062365 | A1 * | 3/2005 | Tanimoto | ..................... 310/327 |
| 2007/0000722 | A1 * | 1/2007 | Capdepuy et al. | ........... 181/290 |

FOREIGN PATENT DOCUMENTS

| | | |
|---|---|---|
| JP | 03-029820 | 2/1991 |
| JP | 03-060084 | 3/1991 |
| JP | 6-28805 A | 2/1994 |
| JP | 08-290114 | 11/1996 |

OTHER PUBLICATIONS

Miniature Piezo Flexure NanoPositioners and Scanners, *PI Politic Catalog*, Germany, Jul. 2000, pp. 2-16 and 2-17.
Vertical/Tilt Piezo Flexure Stage, *PI Politic Catalog*, Germany, Jul. 2000, p. 2-42.
Amplified Piezo Actuators APA L Series, *Cedrat Technologies Catalog*, France, Sep. 2002, p. 56.
International Search Report and Written Opinion of the International Searching Authority, dated Dec. 7, 2006, issued in PCT/JP2004/011016.

* cited by examiner

*Primary Examiner*—J. San Martin
(74) *Attorney, Agent, or Firm*—Christensen O'Connor Johnson Kindness PLLC

(57) ABSTRACT

An actuator includes a piezoelectric element, and a displacement enlargement mechanism which has a movable portion configured to be displaced as the piezoelectric element is displaced and enlarges an amount of displacement of the piezoelectric element. A restraint member is fixed to the movable portion with an elastic or viscoelastic body therebetween and convert vibrational energy of the movable portion into thermal energy based on deformation of the elastic or viscoelastic body, thereby lowering a resonance peak amplitude of the actuator.

18 Claims, 6 Drawing Sheets

METHOD OF DAMPING ACTUATOR AND ACTUATOR

CROSS REFERENCE TO RELATED APPLICATIONS

This is a Continuation Application of PCT Application No. PCT/JP2004/011016, filed Jul. 27, 2004, which was published under PCT Article 21(2) in Japanese.

This application is based upon and claims the benefit of priority from prior Japanese Patent Application No. 2004-073233, filed Mar. 15, 2004, the entire contents of which are incorporated herein by reference.

BACKGROUND OF THE INVENTION

1. Field of the Invention

This invention relates to a method of damping an actuator, provided with a piezoelectric element and a displacement enlargement mechanism, and an actuator having a damping mechanism.

2. Description of the Related Art

A lamination-type piezoelectric element is a driving element that is very effective for high-precision positioning. The lamination-type piezoelectric element includes piezoelectric materials represented by, for example, PZT ($PbZrO_3$—$PbTiO_3$), which has excellent high-speed responsiveness and can generate great force and which are stacked in many layers. However, the amount of displacement of this piezoelectric element for drive is very small or about 1/1,000 of the height of the lamination. If a substantial shear load acts on the piezoelectric element itself, there is a problem that adhesive surfaces of the piezoelectric materials are liable to break. Thus, it is necessary to take account of methods of fixing and supporting the piezoelectric element, connection with parts to be driven, etc. If the simple piezoelectric element is to be used as an actuator, therefore, it is very hard to employ it.

Accordingly, there is proposed an actuator in which a lamination-type piezoelectric element is combined with a displacement enlargement mechanism that geometrically enlarges a small displacement generated by the piezoelectric element and, at the same time, facilitates attachment to fixing portions and parts to be driven. Described in PI-Politic Catalog-2001, issued in July 2000, Germany, pp. 2-16, for example, is a displacement enlargement mechanism that enlarges a displacement of a piezoelectric element by a lever mechanism. Described in the Catalog "CEDRAT TECHNOLOGIES," September 2002, France, p. 56, is a mechanism that extends the diagonals of a rhombic body formed of four elastic hinges, whereby the enlarging ratio shows the ratio between the two diagonal lengths. Described in PI-Politic Catalog-2001, issued in July 2000, Germany, pp. 2-42, is an applicative mechanism that squeezes in a wedge-shaped end by extending a piezoelectric element, thereby enlarging a displacement. Further, an actuator that uses a link mechanism as a displacement enlargement mechanism is proposed in Jpn. Pat. Appln. KOKAI Publication No. 6-28805. The actuator of this type is widely used in the field of industrial devices that require precise positioning.

The greatest advantage of an actuator that comprises a displacement enlargement mechanism and a piezoelectric element is that a characteristic of the actuator can be expressed by a second order lag element that can be represented by one spring, a damper, and a mass, and that high controllability is ensured by one main resonance in a high frequency bandwidth. If the responsiveness is improved, however, the main resonance peak tends to become higher. If a control system of the actuator is constructed with the resonance peak amplitude at a high value, a servo bandwidth (a gain crossover frequency) indicated by frequency that reaches to the zero-cross point is restricted in an open-loop characteristic and constitutes a factor to degrade the control performance. Generally, therefore, an attempt is made that the resonance frequency is within as high a bandwidth as possible to improve the control system, thereby extending the servo bandwidth.

The resonance frequency of the second order lag element indicates fulfills the following expression:

$$\omega n \propto \sqrt{\frac{k}{m}},$$

where m is the mass of the actuator and k is a spring constant. In this expression, moreover, $\omega n$ is a natural angular frequency of the system, and a resonance frequency f is $f = \omega n/2\pi$.

If the mass of the actuator, that is, the mass of a movable portion, is fixed, the spring stiffness of the displacement enlargement mechanism must be enhanced to increase the resonance frequency of the actuator.

On the other hand, the displacement of the lamination-type piezoelectric element is substantially in inverse proportion to the generated force, so that the extension of the piezoelectric element must be reduced, as the generated force increases. If the spring constant is enhanced to increase the resonance frequency, therefore, a maximum displacement amount of the actuator is lessened inevitably. The relationship between the resonance frequency and the maximum displacement amount of the actuator is trade-off to each other, and it is very difficult for them to be compatible with each other.

The actuator constructed in this manner can be easily handled as a mechanical part. Mechanically, it is configured so that the displacement can be enlarged. Actually, in order to achieve compatibility with a high resonance frequency, however, the actuator can generate only the maximum displacement amount that is substantially equal to a no-load maximum displacement amount of the used simple lamination-type piezoelectric element, in many cases. With the actuator that is formed by combining the displacement enlargement mechanism and the lamination-type piezoelectric element, some design conditions naturally restrain the resonance frequency from being unlimitedly increased without failing to secure a desired maximum displacement amount in order to improve the control performance. This produces a serious problem in constructing a high-speed, high-accuracy control system.

In extending the control bandwidth of the control system by mechanical improvement, in the actuator that comprises the lamination-type piezoelectric element and the displacement enlargement mechanism, the resonance frequency is increased to a higher bandwidth or the damping performance is enhanced to lower the resonance peak amplitude lest the peak amplitude of the resonance frequency exceed a cross line of 0 dB and make the system unstable.

If the improvement is to be made based on the design of the control system, on the other hand, a conventional PID (proportional-integral-derivative) controller generally cancels the resonance peak with antiresonance characteristics given by a narrow-bandwidth notch filter. Since the notch filter causes a phase inversion at the same time, however, the control performance cannot be enhanced fundamentally.

Further, the frequency can be shaped with an H∞ that has a robust control performance, and the resonance peak amplitude can be canceled with the antiresonance characteristics without influencing the phase characteristics. However, the control system becomes a high order and is complicated. Therefore, the cancellation of the resonance peak amplitude cannot be easily realized without using a control system design CAD (MATLAB) or a DPS (digital signal processor) that is expensive although having high-speed calculation capacity. If high-speed performance is required, as is the case with the actuator, moreover, the computation capacity of the existing DSP cannot realize a desired controller, depending on the order number of the control system. Unlike the PID controller, furthermore, robust controllers, such as the H∞ that can be realized by the DSP using the CAD, cannot be easily adjusted based on a personal experience or feeling, so that they are prevented from becoming prevalent.

Thus, improving the damping capacity of the actuator itself to lower its resonance peak is a fundamental improvement necessary for the enhancement of the control bandwidth and is the most effective countermeasure. Conventionally, a damping material, such as rubber or paper, is sandwiched between fixing portions and a support portion of an actuator, and vibrational energy in the actuator is converted into thermal energy by contact friction between parts or fastening screw surfaces, whereby the resonance peak is damped. By lowering the fastening force of the fixing portions of the actuator, moreover, the contact friction at the support portion of the actuator can be increased, and vibrational energy generated by resonance can be converted into thermal energy to be damped so that the resonance peak is lowered. If this is done, on the other hand, the resonance frequency also lowers inevitably, in general. As one of methods that are effective although not essential, there is a technique in which the tightening torque of fixing screws is controlled, so that the resonance peak can be made as low as possible without failing to keeping the resonance frequency high.

However, a damping force that is generated by this technique is not very large but only serves to adjust the resonance peak not to be unduly high. If an elastic or viscoelastic body, such as a damping material, is sandwiched between the fixing portions, the positioning accuracy is adversely affected when the actuator is mounted with the fixing portions used as references. Thus, this technique is not desirable as a fixing method for the actuator in which precision positioning is essential.

BRIEF SUMMARY OF THE INVENTION

This invention has been made in consideration of these points, and its object is to provide a method of damping an actuator and an actuator such that the inherent resonance peak amplitude of the actuator can be damped satisfactorily without hindering characteristics of the actuator that comprises a lamination-type piezoelectric element and a displacement enlargement mechanism.

An additional mechanism that restrains the action of a mechanical section considerably reduces a maximum displacement or shifts a resonance frequency to a lower bandwidth even if the damping properties are increased. Therefore, it is common that another problem arises despite the reduction of the resonance peak. However, an object to which the present invention is applied is a mechanism applicable in a displacement area that can be the to be a strain in a conventional machine mechanism without exaggeration, and it cannot be covered by a usual mechanical common sense. Further, the target resonance frequency is ten times or more higher than that of the conventional machine mechanism, so that the resulting mechanism has a very large resonance peak.

According to an aspect of the invention, there is provided a method of damping an actuator to lower a resonance peak of the actuator comprising a piezoelectric element and a displacement enlargement mechanism which has a movable portion configured to be displaced as the piezoelectric element is displaced and enlarges an amount of displacement of the piezoelectric element, the comprising:

fixing a restraint member to the movable portion with an elastic or viscoelastic body therebetween, and converting vibrational energy of the movable portion into thermal energy based on strain attributable to deformation of the elastic or viscoelastic body, thereby lowering the resonance peak amplitude of the actuator.

An actuator according to another aspect of the invention, comprises a piezoelectric element; a displacement enlargement mechanism which has a movable portion configured to be displaced as the piezoelectric element is displaced and enlarges an amount of displacement of the piezoelectric element; and a restraint member which is fixed to the movable portion with an elastic or viscoelastic body therebetween and convert vibrational energy of the movable portion into thermal energy based on deformation of the elastic or viscoelastic body, thereby lowering a resonance peak.

According to the method of damping an actuator and the actuator constructed in this manner, the restraint members are joined to the movable portion of the displacement enlargement mechanism with the elastic or viscoelastic body therebetween, and the elastic or viscoelastic body is distorted by vibration that is caused by resonance. Thereupon, vibrational energy is converted into thermal energy (frictional heat) by viscous resistance or internal strain, so that the resonance peak can be lowered efficiently.

The restraint members that are joined to the movable portion of the displacement enlargement mechanism with the elastic or viscoelastic body therebetween have an effect to restrain the action of the movable portion, thereby enhancing the resonance frequency of, the actuator and restraining resonance of a torsional mode.

If the displacement enlargement mechanism used comprises link portions and a movable member, the restraint members are stretched as bridges between the link portions to intentionally restrain action between the link portions. By also bridging the movable member and a support portion, moreover, areas of contact between the displacement enlargement mechanism and the restraint members are maximized so that the elastic or viscoelastic body can be distorted as efficiently as possible. By doing this, the large inherent resonance peak of the actuator can be lowered considerably.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Actuators according to embodiments of this invention and a method of damping an actuator will now be described in detail with reference to the drawings.

Figure 1:
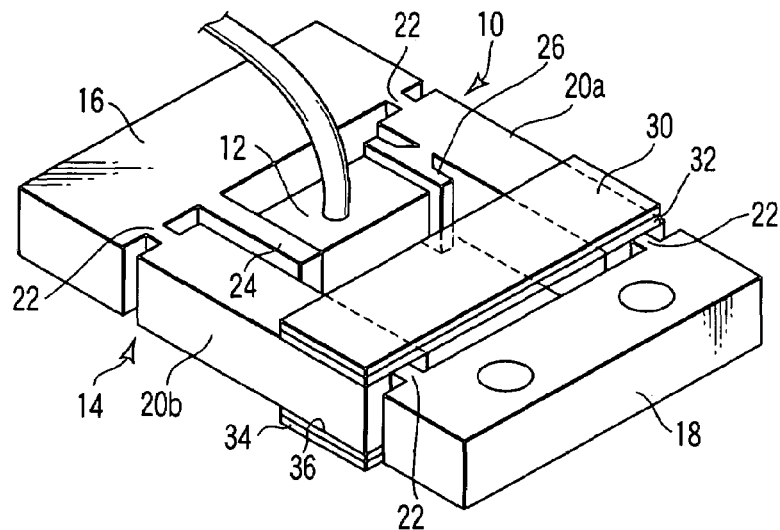
FIG. 1 is a perspective view showing an actuator according to a first embodiment of this invention.
Figure 2:
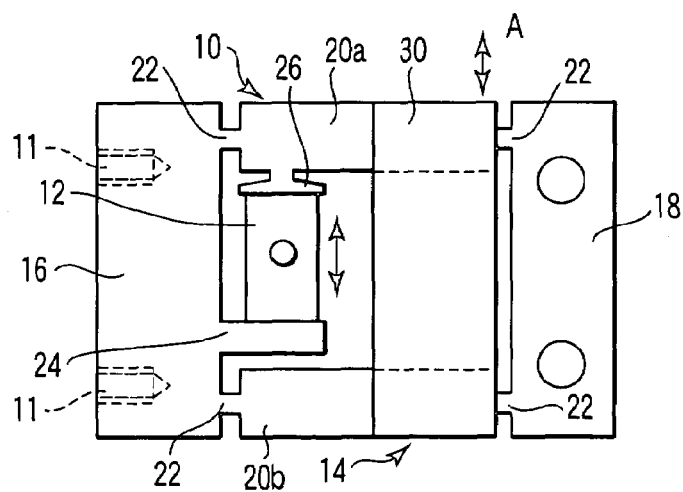
FIG. 2 is a plan view of the actuator.
Figure 3:
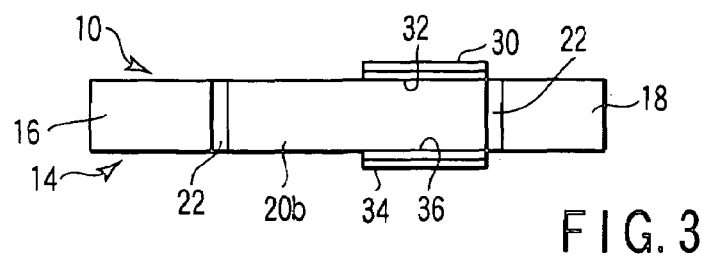
FIG. 3 is a side view of the actuator.

As shown in FIGS. 1 to 3, an actuator 10 comprises a lamination-type piezoelectric element 12 and a displacement enlargement mechanism 14 for enlarging a displacement of the piezoelectric element 12. The displacement enlargement mechanism 14 has a prism-shaped support portion 16, a prism-shaped movable member 18 opposed to the support portion 16 with a substantially parallel-sided gap between them, and a pair of parallel link portions 20a and 20b extending between the support portion 16 and the movable member 18, and is in the form of a substantially rectangular frame as a whole. The respective opposite ends of the link portions 20a and 20b are coupled to the support portion 16 and the movable member 18 by elastic hinges 22, individually. The link portions 20a and 20b are capable of equivalent rocking motion or the like around the elastic hinges 22 based on elastic deformation of the elastic hinges.

The support portion 16 is formed with threaded holes 11 for screwing the support portion to a desired region. The support portion 16 is formed integrally with a pedestal portion 24 that projects toward the movable member 18, and one end of the piezoelectric element 12 is fixed to the pedestal portion 24. The other end of the piezoelectric element 12 is connected to the one link portion 20a by a lever mechanism 26. When the piezoelectric element 12 is displaced, this displacement is augmented by the lever mechanism 26 and transmitted to the one link portion 20a. Thereupon, the link portion 20a moves in the direction of arrow A with respect to the support portion 16. As this is done, the movable member 18 and the other link portion 20b move in the direction of arrow A. In consequence, the displacement enlargement mechanism 14 in the form of a substantially rectangular frame changes into the form of a parallelogrammatic frame. Thus, the displacement of the piezoelectric element 12 is enlarged by the displacement enlargement mechanism 14 and output as a displacement of the movable member 18.

The support portion 16, movable member 18, link portions 20a and 20b, elastic hinges 22, and lever mechanism 26 of the displacement enlargement mechanism 14 are molded integrally from a high-stiffness material, e.g., metal such as duralumin (high-strength aluminum) or stainless steel, or ceramics. The movable member 18, link portions 20a and 20b, elastic hinges 22, and lever mechanism 26 function as a movable portion of the displacement enlargement mechanism 14.

A restraint member 30 is fixed to the movable portion of the displacement enlargement mechanism 14 through an elastic or viscoelastic body. In the present embodiment, the restraint member 30 is a rectangular, flat plate formed of aluminum or stainless steel, an elastic or viscoelastic body 32 is applied to the whole area of its one surface, thereby forming a viscoelastic layer. For example, the restraint member 30 has a plate thickness of about 0.2 to 1.0 mm, while the viscoelastic body 32 is formed having a layer thickness of about 0.04 to 0.2 mm. The restraint member 30 is fixed on the displacement enlargement mechanism 14 with its viscoelastic body 32 side in surface contact with a surface of the displacement enlargement mechanism. In this case, the restraint member 30 is fixed on end parts of the pair of link portions 20a and 20b on the movable member 18 side, thereby bridging the pair of link portions. The viscosity of an adhesive agent or the viscoelastic body 32 itself can be utilized to fix the restraint member 30 to the displacement enlargement mechanism 14.

According to the actuator 10 constructed in this manner, the restraint member 30 is stretched as a bridge between the parallel link portions 20a and 20b to intentionally restrain action between the link portions, thereby efficiently distorting the viscoelastic body 32 depending on vibration of the displacement enlargement mechanism 14. At the same time, the strain of the viscoelastic body 32 can be augmented by restraining deformation of the restraint member-side surface of the viscoelastic body 32. By being distorted, the viscoelastic body 32 converts vibrational energy into thermal energy, thereby damping the vibration. Thus, the actuator 10 that is composed of the displacement enlargement mechanism 14, and the lamination-type piezoelectric element 12 can efficiently damp its large resonance peak amplitude as the resonance frequency of the actuator is increased.

Since the restraint member 30 and the viscoelastic body 32 are located within a plane parallel to the respective top surfaces of the link portions 20a and 20b, that is, the movement direction of the movable portion, the actuator 10 can be restrained within the movement plane to effectively restrain deformation such as unnecessary twist of the displacement enlargement mechanism 14 in any other direction than the movement direction.

The restraint member 30 and the viscoelastic body 32 may be provided on the reverse side of the actuator 10 as well as on the top side. Specifically, a restraint member 34, which is similar to the restraint member 30, is fixed bridging the pair of link portions 20a and 20b and faces the restraint member 30, on the reverse side of the actuator 10. The restraint member 34 is fixed to the displacement enlargement mechanism 14 through a viscoelastic body 36, which is fixed utilizing the viscosity of the adhesive agent or the viscoelastic body 32 itself.

Since the restraint members are provided individually on both the top and reverse surface sides of the actuator 10 with the aid of the viscoelastic or elastic members, the resonance peak of the actuator can be further damped by about half, compared with the case where the restraint member is provided on one surface side only.

Figure 4:
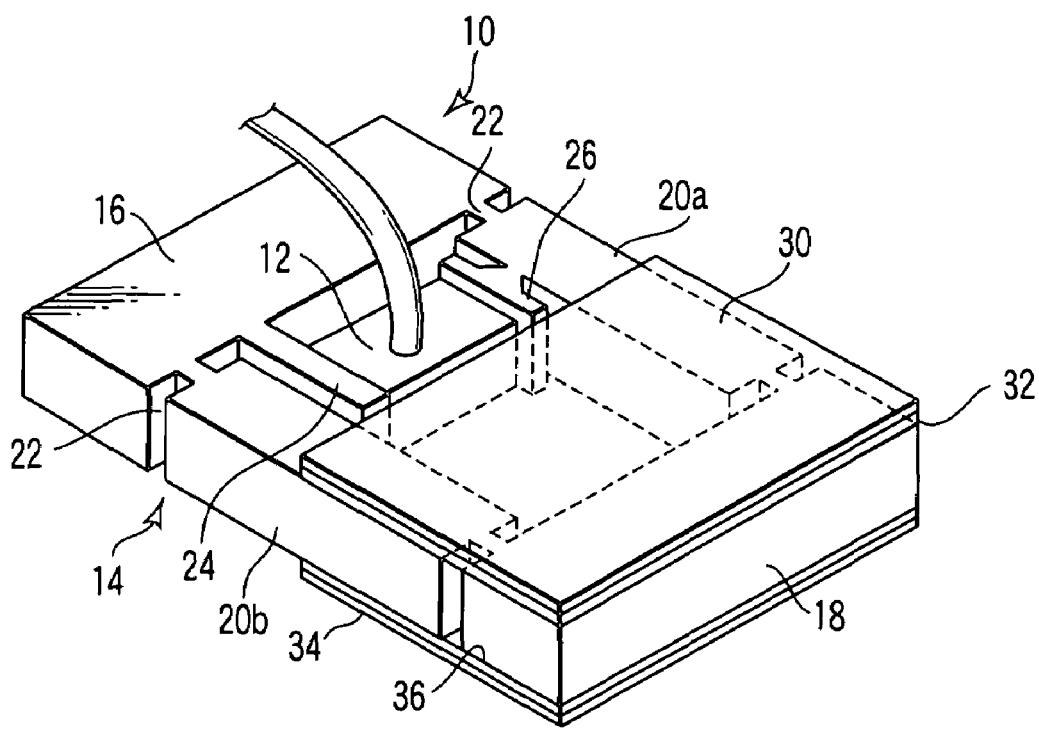
FIG. 4 is a perspective view showing an actuator according to a second embodiment of this invention.
Figure 5:
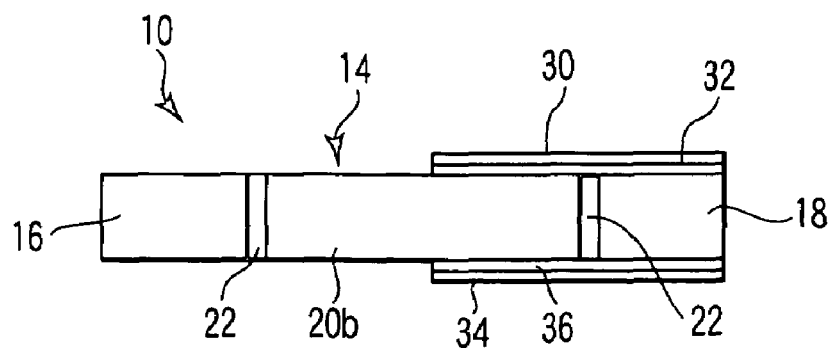
FIG. 5 is a side view of the actuator according to the second embodiment.

According to a second embodiment shown in FIGS. 4 and 5, a restraint member 30 and a viscoelastic body 32 are formed in the shape of rectangular plates larger than those of the foregoing first embodiment, and they are fixed covering a movable member 18 as well as link portions 20a and 20b, on the top side of a displacement enlargement mechanism 14. Likewise, a restraint member 34 and a viscoelastic body 36 are fixed covering the movable member 18 as well as the link portions 20a and 20b, on the underside of the displacement enlargement mechanism 14, and they face the restraint member 30 in a parallel relationship. The restraint members 30 and 34 are pasted on the surfaces of the displacement enlargement mechanism 14 with the viscoelastic bodies 32 and 36, respectively.

Since other configurations of an actuator 10 are identical with those of the foregoing first embodiment, a detailed description thereof is omitted.

According to the second embodiment, the areas of movable portion of the displacement enlargement mechanism 14 in contact with the restraint members 30 and 34 and the viscoelastic bodies 32 and 36 are increased, so that the resonance peak of the actuator 10 can be damped more effectively. If the restraint member 30 and the viscoelastic body 32 are provided only on the top side of the displacement enlargement mechanism 14, the resonance peak can be damped to 5/100 of that of an actuator that has neither a restraint member nor a viscoelastic body. The resonance peak can be further damped by half by providing the restraint members and the viscoelastic bodies on both surface sides of the displacement enlargement mechanism 14. Besides, the same functions and effects of the first embodiment can be obtained with the second embodiment.

Figure 6:
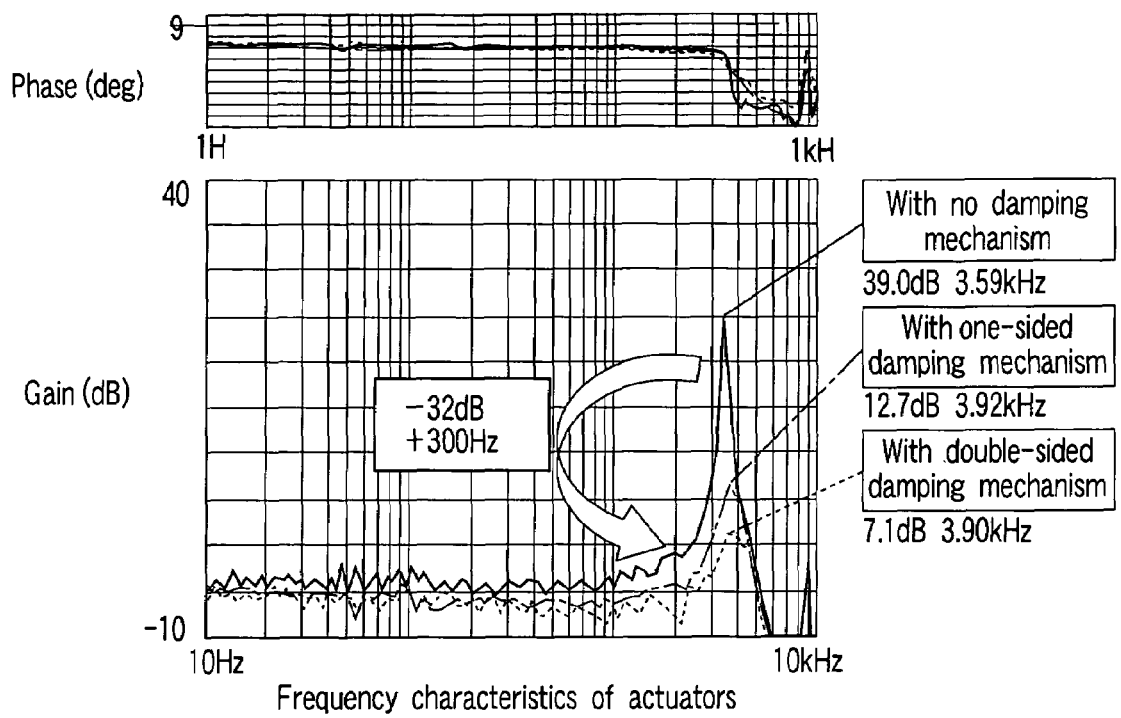
FIG. 6 is a diagram comparatively showing respective frequency response of the actuator according to the second embodiment and a conventional actuator.

A conventional actuator having no damping mechanism and the actuator 10 according to the second embodiment are prepared, and their frequency characteristics are compared. FIG. 6 shows results of the comparison. As seen from this figure, the conventional actuator is a mechanism indicative of a second order lag element that can be represented by one spring, a damper, and a mass, and involves a very large resonance peak amplitude of 39 dB at a resonance frequency of 3.6 kHz. In the actuator according to the second embodiment in which the aluminum restraint member 30 coated with the viscoelastic body 32 is attached to the top surface of the displacement enlargement mechanism 14, the resonance frequency is increased by 300 Hz to 3.9 kHz, while the resonance peak is lowered by 26.3 dB to 12.7 dB. The amplitude of the resonance peak of the actuator is considerably damped to 5/100 of a conventional value.

When the restraint member 34 and the viscoelastic body 36 were fixed also to the reverse side of the actuator 10, an effect was able to be confirmed that the resonance frequency of the actuator made no change at all and that only the resonance peak was further lowered to 2.5/100 of that of the conventional actuator, that is, the resonance peak for the case where restraint member and the viscoelastic body were attached only to the top surface was further reduced to ½.

Figure 7:
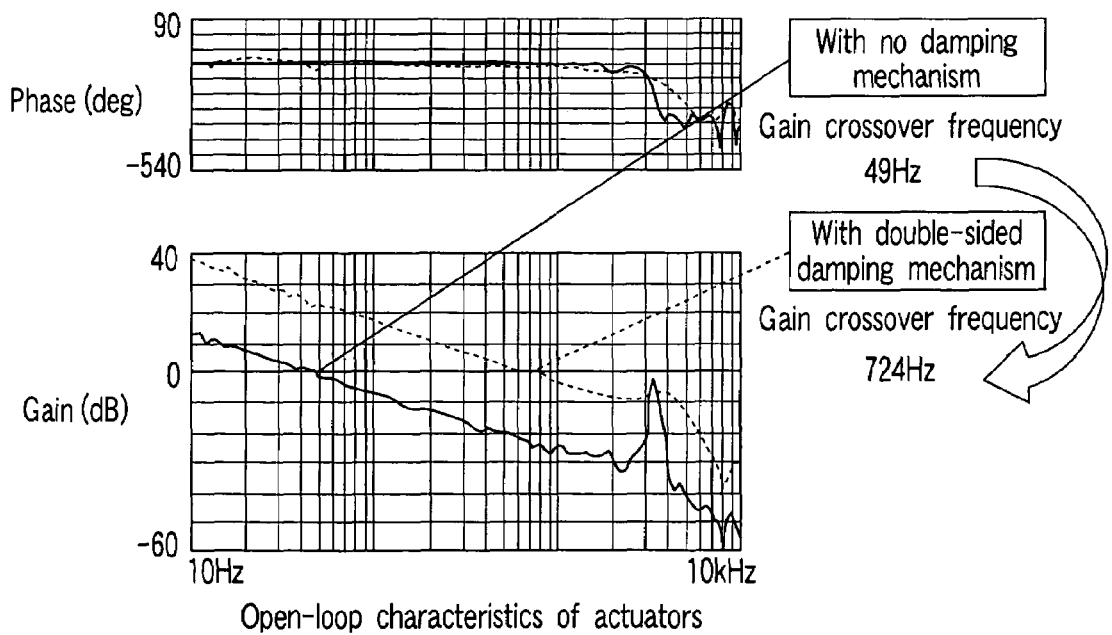
FIG. 7 is a diagram comparatively showing respective open-loop transfer function of control systems of the actuator according to the second embodiment and the conventional actuator.

Based on the damping effect obtained in this manner, the controllability of the actuator can be improved drastically. FIG. 7 shows an open-loop transfer function of a PI control system measured when the system is constructed using high-speed bipolar power source as a drive source for the actuator with an optical fiber displacement sensor used as position feedback. If the control system is constructed using the conventional actuator, its high resonance peak facilitates the attainment of the 0-dB line as a standard for the stabilization of the control system. Therefore, an obtained servo bandwidth (control bandwidth) is a very low bandwidth of 49 Hz, so that the control performance cannot be improved.

If damping mechanisms, i.e., the viscoelastic bodies and the restraint members, are attached individually to both surfaces of the actuator, on the other hand, the resonance peak can be considerably damped without lowering the frequency for it, so that a large margin can be obtained before the 0-dB line is reached. In consequence, when the damping mechanisms were provided on both surfaces, the servo bandwidth of the control system was able to be extended to 724 kHz, which is 15 times higher than that of the conventional actuator.

Figure 8:
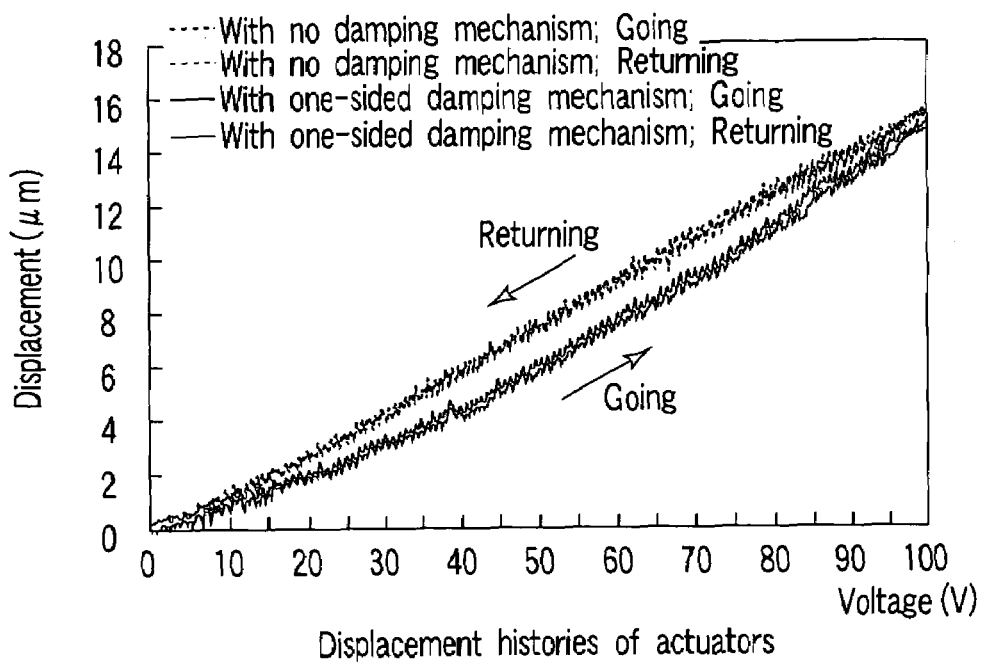
FIG. 8 is a diagram comparatively showing respective displacement histories of the actuator according to the second embodiment and the conventional actuator.

Even if the control performance is improved in the aforesaid manner, reduction of a maximum displacement amount must be substantially avoided in the actuator that combines the lamination-type piezoelectric element and the displacement enlargement mechanism. Although the restraint members were attached to the top and reverse surfaces of displacement enlargement mechanism, according to the embodiment described above, however, the reduction of the maximum displacement amount of the actuator was less than 5% of the maximum displacement amount of the actuator with no damping mechanism, proving to be within a measurement error range, as shown in FIG. 8. Since the resonance frequency of the actuator can be increased, according to the present embodiment, an increment of the resonance frequency may possibly be distributed to a displacement enlargement ratio to achieve optimization such that the resonance frequency and the enlargement ratio are fixed and improved, respectively. By doing this, the resonance peak can be considerably lowered without failing to maintain performance equivalent to that of the actuator that has no damping mechanism.

Figure 9:
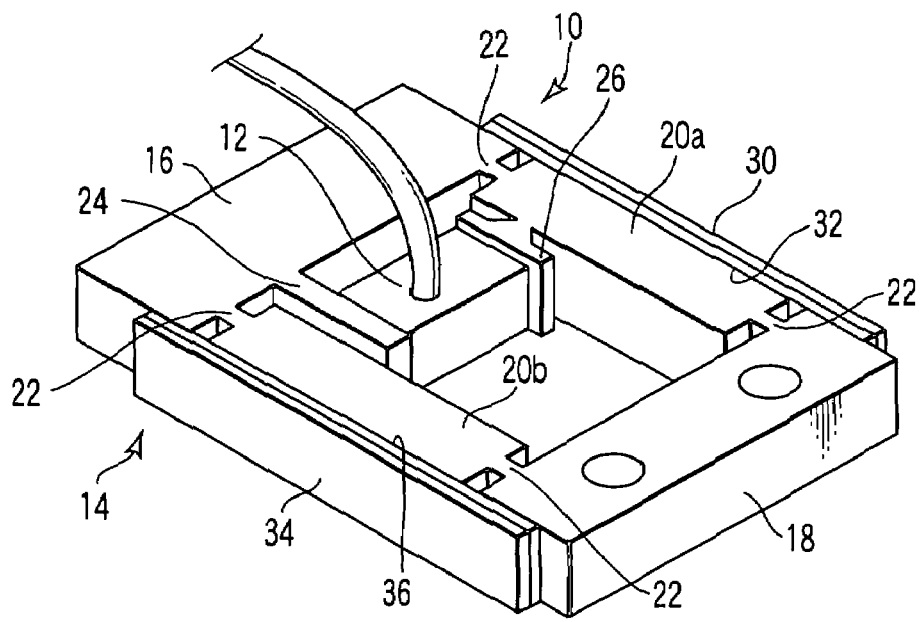
FIG. 9 is a perspective view showing an actuator according to a third embodiment of this invention.

The following is a description of an actuator according to a third embodiment of this invention. According to the third embodiment, as shown in FIG. 9, a restraint member 30 and a viscoelastic body 32 are formed in the shape of elongated rectangles, and they are fixed covering an entire side face of a displacement enlargement mechanism 14, that is, covering a side face of a support portion 16, a side face of a link portion 20a, and a side face of a movable member 18. Likewise, a restraint member 34 and a viscoelastic body 36 are fixed covering the other side face of the support portion 16, a side face of a link portion 20b and the other side face of the movable member 18. The restraint members 30 and 34 are pasted on the surfaces of the displacement enlargement mechanism 14 with the viscoelastic bodies 32 and 36, respectively.

Since other configurations of an actuator 10 are identical with those of the foregoing first embodiment, a detailed description thereof is omitted.

According to the third embodiment, the support portion 16, the restraint members and the viscoelastic bodies are fixed bridging the support portion 16, movable member 18, and link portions 20a and 20b, thereby restraining action of the link portions 20a and 20b. Thus, a damping effect that ensures a large resonance peak can be obtained without spoiling inherent characteristics of the actuator, such as the maximum displacement amount, resonance frequency, deformation, etc. In order to uniformly deform the displacement enlargement mechanism 14 to improve the damping properties, it is desirable to locate the elastic or viscoelastic bodies and the restraint members on both side faces of the displacement enlargement mechanism 14. However, a great damping effect can be obtained even when the members are only on one side face.

Figure 10:
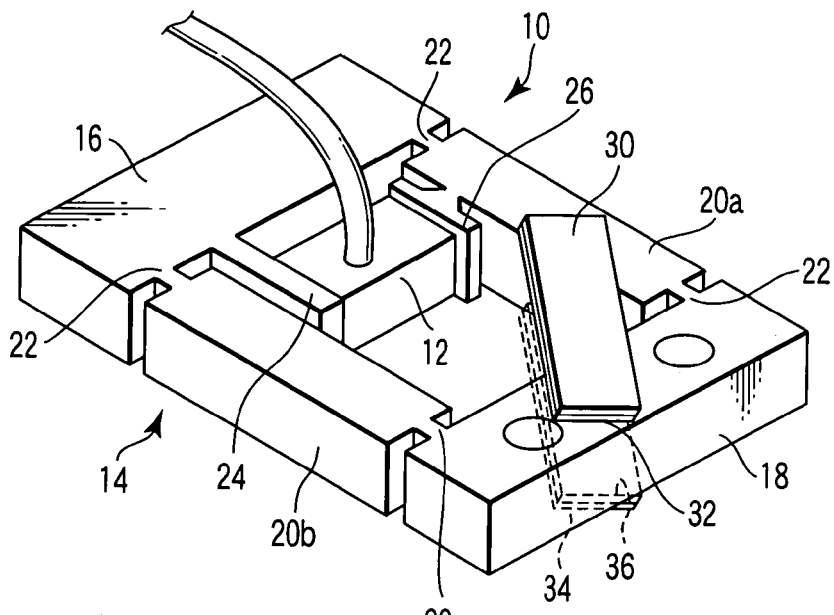
FIG. 10 is a perspective view showing an actuator according to a fourth embodiment of this invention.

According to a fourth embodiment shown in FIG. 10, a restraint member 30 and a viscoelastic body 32 are formed in the shape of elongate rectangles, and they are fixed covering a link portion 20*a* and a movable member 18 and bridge the link portion 20*a* and the movable member 18, on the top side of a displacement enlargement mechanism 14. Likewise, a restraint member 34 and a viscoelastic body 36 are fixed covering the link portion 20*a* and the movable member 18, on the reverse side of the displacement enlargement mechanism 14, and they face the restraint member 30 in a parallel relationship. The restraint members 30 and 34 are pasted on the surfaces of the displacement enlargement mechanism 14 with the viscoelastic bodies 32 and 36, respectively.

Since other configurations of an actuator 10 are identical with those of the foregoing first embodiment, a detailed description thereof is omitted. Also in the fourth embodiment, the resonance peak can be efficiently damped without inherent characteristics of the actuator 10. A satisfactory damping effect can be obtained if the restraint member and the viscoelastic body are provided on one of the surfaces, obverse or reverse, of the actuator instead of being provided on both surfaces.

Figure 11:
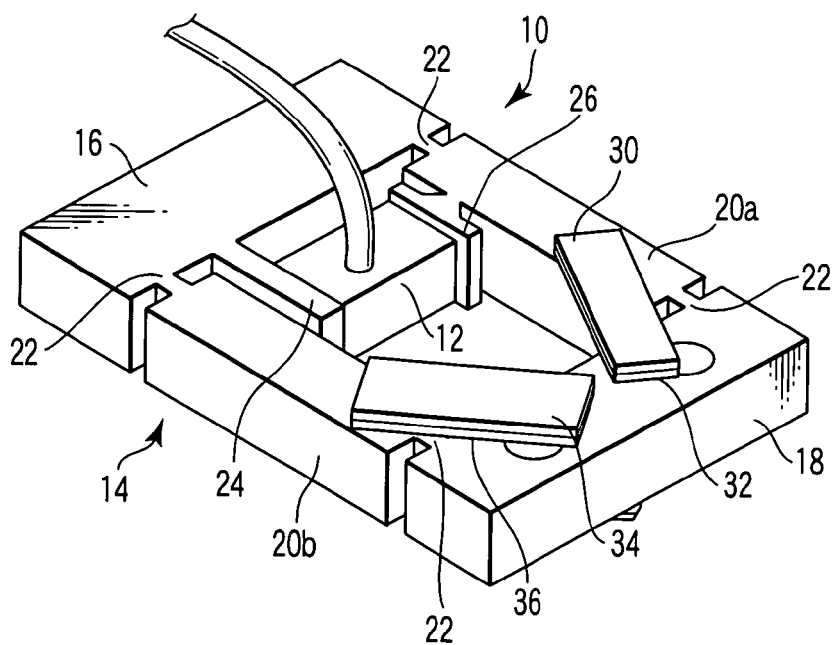
FIG. 11 is a perspective view showing an actuator according to a fifth embodiment of this invention.
Figure 12:
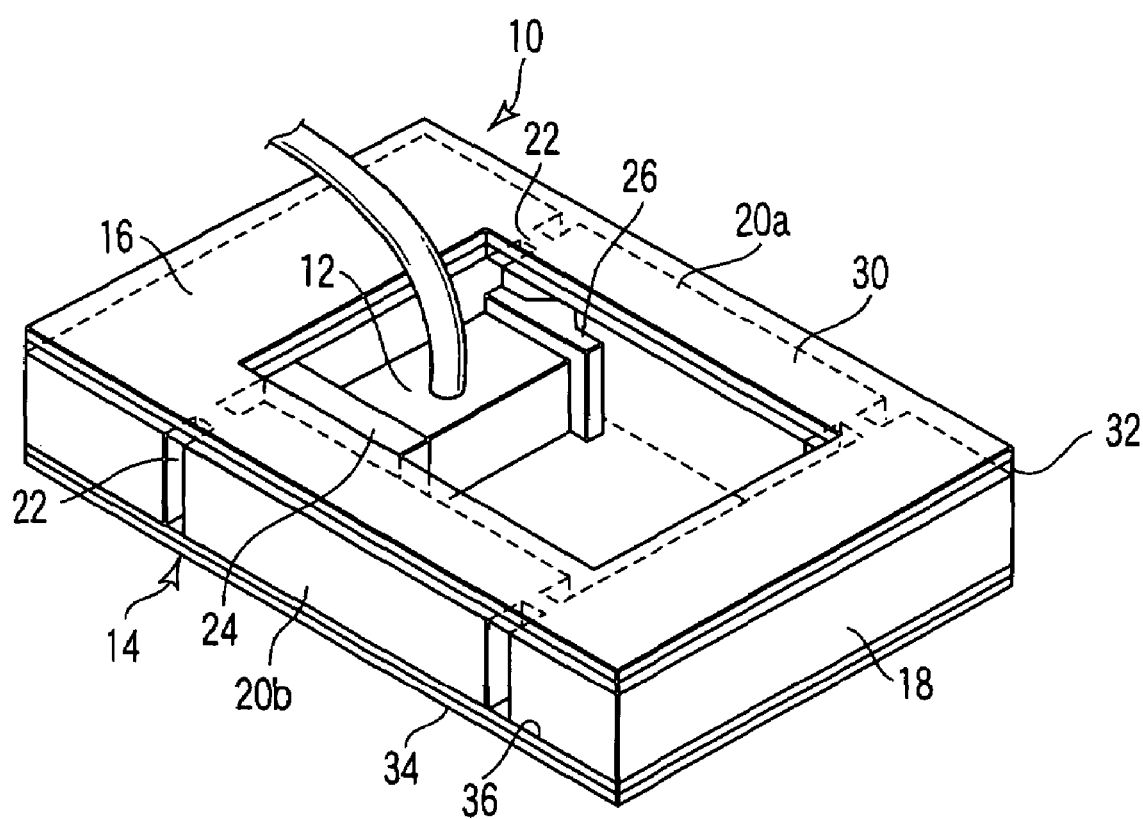
FIG. 12 is a perspective view showing an actuator according to a sixth embodiment of this invention.

As in a fifth embodiment shown in FIG. 11, a restraint member 34 and a viscoelastic body 36 may be fixed bridging the other link portion 20*b* and a movable member 18 or fixed covering the link portion and the movable member 18. As in a sixth embodiment shown in FIG. 12, moreover, annular restraint members 30 and 34 and viscoelastic bodies 32 and 36 may be fixed bridging a support portion 16, a pair of link portions 20*a* and 20*b* and a movable member 18.

The same functions and effects as aforesaid can be obtained even if elastic bodies are used in place of the viscoelastic bodies in the first to sixth embodiments.

Thus, according to the actuator and the damping method according to each of the embodiments described above, the damping properties can be improved without failing to provide a higher bandwidth for the resonance frequency of the actuator, the displacement amount and resonance frequency proper to the actuator cannot be greatly influenced, and at the same time, unnecessary behaviors in any other directions than the driving direction can be prevented.

The present invention is not limited solely to the embodiments described above, and its components may be embodied in modified forms without departing from the spirit of the invention. Further, various inventions may be made by suitably combining a plurality of components described in connection with the foregoing embodiments. For example, some of the components according to the foregoing embodiments may be omitted. Furthermore, components according to different embodiments may be combined as required.

In the structure mainly explained in connection with the embodiments described above, based on the results of demonstrations, the elastic or viscoelastic bodies are interposed between the movable portion and the restraint members of the actuator. What is important, however, is that the stiffness of the actuator is increased by restraining the mechanical section so that only the resonance peak is considerably lowered without changing the maximum displacement amount or the resonance frequency. Thus, the material itself for obtaining the damping effect is not limited to the foregoing embodiments, but restraint members that have their own damping capacity may be fixed to the movable portion of the actuator with screws or the like, for example.

Besides, the restraint members and the viscoelastic or elastic bodies are not limited to the shape of rectangular plates, but may be of any other shape as required. Further, the viscoelastic or elastic bodies need not be provided covering the whole surfaces of the restraint members, but may be formed having an area smaller than that of the restraint members. Furthermore, the movable portion of the displacement enlargement mechanism of the actuator is not limited to the combination of the link portions, elastic hinges, or movable member, but various structures may alternatively be used only if they can enlarge the displacement of the piezoelectric element. The piezoelectric element is not limited to the lamination type, but driving elements having similar characteristics, such as some other piezoelectric elements, magnetostriction, etc., may be used instead.

What is claimed is:

1. A method of damping an actuator to lower a resonance peak amplitude of the actuator, the actuator comprising a piezoelectric element and a displacement enlargement mechanism which has a support portion on which the piezoelectric element is fixed, and a movable portion configured to be displaced, in a plane where the piezoelectric element displaces, as the piezoelectric element is displaced and which enlarges an amount of displacement of the piezoelectric element, the method comprising:

fixing a restraint member on the movable portion with an elastic or viscoelastic body therebetween, and lowering the resonance peak amplitude of the actuator by converting vibrational energy of the movable portion into thermal energy based on strain attributable to deformation of the elastic or viscoelastic body.

2. The method of damping an actuator according to claim 1, wherein the movable portion includes a movable member opposed to the support portion and movable in the plane, and a link portion which couples the support portion and the movable member with elastic hinges and moves in the plane as the piezoelectric element is displaced, and the restraint member is fixed on the support portion, the link portion, and the movable member with the elastic or viscoelastic body therebetween.

3. The method of damping an actuator according to claim 1, wherein the movable portion includes a movable member opposed to the support portion and movable in the plane, and a link portion which couples the support portion and the movable member with elastic hinges and moves in the plane as the piezoelectric element is displaced, and the restraint member is fixed on the support portion, the link portion, and the movable member with the elastic or viscoelastic body therebetween.

4. The method of damping an actuator according to claim 1, wherein the movable portion includes a movable member opposed to the support portion and movable in the plane, and a pair of parallel link portions which individually couple the support portion with elastic hinges and the movable member and move in the plane as the piezoelectric element is displaced, and the restraint member is fixed on the pair of link portions with the elastic or viscoelastic body therebetween.

5. The method of damping an actuator according to claim 1, wherein the movable portion includes a movable member opposed to the support portion and movable in the plane, and a pair of parallel link portions which individually couple the support portion and the movable member with elastic hinges and move in the plane as the piezoelectric element is displaced, and the restraint member is fixed on the pair of link portions and the movable member with the elastic or viscoelastic body therebetween.

6. The method of damping an actuator according to claim 1, wherein the movable portion includes a movable member opposed to the support portion and movable in the plane, and a pair of parallel link portions which individually couple the support portion with elastic hinges and the movable member and move in the plane as the piezoelectric element is displaced, and the restraint member is fixed on the support portion and the pair of link portions with the elastic or viscoelastic body therebetween.

7. The method of damping an actuator according to claim 1, wherein the movable portion includes a movable member opposed to the support portion and movable in the plane, and a pair of parallel link portions which individually couple the support portion and the movable member with elastic hinges and move in the plane as the piezoelectric element is displaced, and the restraint member is fixed onto the support portion, the pair of link portions, and the movable member with the elastic or viscoelastic body therebetween.

8. The method of damping an actuator according to claim 1, wherein the displacement enlargement mechanism has a top surface and a reverse surface opposed to the top surface, and restraint members are fixed individually to the top and reverse surfaces of the displacement mechanism.

9. The method of damping an actuator according to claim 1, wherein the restraint member is a flat plate formed of metal plates or ceramics higher in stiffness than the elastic or viscoelastic body.

10. An actuator comprising:
a piezoelectric clement;
a displacement enlargement mechanism which has a support portion on which the piezoelectric element is fixed, and a movable portion configured to be displaced, in a plane wherein the piezoelectric element displaces, as the piezoelectric element is displaced and enlarges an amount of displacement of the piezoelectric element; and
a restraint member which is fixed on the movable portion with an elastic or viscoelastic body therebetween and converts vibrational energy of the movable portion into thermal energy based on deformation of the elastic or viscoelastic body to lower a resonance peak amplitude.

11. The actuator according to claim 10, wherein the movable portion includes a movable member opposed to the support portion and movable in the plane, and a link portion which couples the support portion and the movable member with elastic hinges and moves in the plane as the piezoelectric element is displaced, and the restraint member is fixed on the link portions and the movable member with the elastic or viscoelastic body therebetween.

12. The actuator according to claim 10, wherein the movable portion includes a movable member opposed to the support portion and movable in the plane, and a link portion which couples the support portion and the movable member with elastic hinges and moves in the plane as the piezoelectric element is displaced, and the restraint member is fixed on the support portion, the link portions, and the movable member with the elastic or viscoelastic body therebetween.

13. The actuator according to claim 10, wherein the movable portion includes a movable member opposed to the support portion and movable in the plane, and a pair of parallel link portions which individually couple the support portion and the movable member with elastic hinges and move in the plane as the piezoelectric element is displaced, and the restraint member is fixed on the pair of link portions with the elastic or viscoelastic body therebetween.

14. The actuator according to claim 10, wherein the movable portion includes a movable member opposed to the support portion and movable in the plane, and a pair of parallel link portions which individually couple the support portion and the movable member with elastic hinges and move in the plane as the piezoelectric element is displaced, and the restraint member is fixed on the pair of link portions and the movable member with the elastic or viscoelastic body therebetween.

15. The actuator according to claim 10, wherein the movable portion includes a movable member opposed to the support portion and movable in the plane, and a pair of parallel link portions which individually couple the support portion and the movable member with elastic hinges and move in the plane as the piezoelectric element is displaced, and the restraint member is fixed on the support portion and the pair of link portions with the elastic or viscoelastic body therebetween.

16. The actuator according to claim 10, wherein the movable portion includes a movable member opposed to the support portion and movable in the plane, and a pair of parallel link portions which individually couple the support portion and the movable member with elastic hinges and move in the plane as the piezoelectric element is displaced, and the restraint member is fixed on the support portion, the pair of link portions, and the movable member with the elastic or viscoelastic body therebetween.

17. The actuator according to claim 10, wherein the displacement enlargement mechanism has a top surface and a reverse surface opposed to the top surface, and the restraint member includes a first restraint member and a second restraint member fixed individually to the top and reverse surfaces of the displacement mechanism with the elastic or viscoelastic body therebetween.

18. The actuator according to claim 10, wherein the restraint member is formed of metal plates or ceramics higher in stiffness than the elastic or viscoelastic body.

* * * * *

UNITED STATES PATENT AND TRADEMARK OFFICE
CERTIFICATE OF CORRECTION

| | |
|---|---|
| PATENT NO. | : 7,332,848 B2 |
| APPLICATION NO. | : 11/388404 |
| DATED | : February 19, 2008 |
| INVENTOR(S) | : S. Mori |

It is certified that error appears in the above-identified patent and that said Letters Patent is hereby corrected as shown below:

| COLUMN | LINE | ERROR |
|---|---|---|
| 11 | 29 | "clement;" should read --element;-- |

Signed and Sealed this
Twenty-seventh Day of September, 2011

David J. Kappos
*Director of the United States Patent and Trademark Office*